United States Patent
Yamada

[11] Patent Number: 6,047,891
[45] Date of Patent: *Apr. 11, 2000

[54] PHOTOGRAPHIC PRINTING APPARATUS

[75] Inventor: Junji Yamada, Wakayama, Japan

[73] Assignee: Noritsu Koki Co., Ltd., Wakayama-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/702,831

[22] Filed: Aug. 23, 1996

[30] Foreign Application Priority Data

Aug. 24, 1995 [JP] Japan .................................. 7-215560

[51] Int. Cl.⁷ .................................................. G06K 7/10
[52] U.S. Cl. ............................. 235/462.05; 235/380
[58] Field of Search ................................ 235/380, 375, 235/449, 462.05, 462.13; 396/210, 310, 319; 399/144

[56] References Cited

U.S. PATENT DOCUMENTS

| | | | |
|---|---|---|---|
| 4,827,109 | 5/1989 | Matsumoto et al. | 235/375 |
| 4,951,086 | 8/1990 | Hicks | 355/41 |

FOREIGN PATENT DOCUMENTS

| | | |
|---|---|---|
| 0544255 | 6/1993 | European Pat. Off. . |
| 0615154 | 9/1994 | European Pat. Off. . |
| 2659461 | 9/1991 | France . |
| 62154845 | 9/1987 | Japan . |
| 63217344 | 9/1988 | Japan . |
| 7239511 | 9/1995 | Japan . |

OTHER PUBLICATIONS

Anonymous: "Data reproduction on photographic pritns using film—film, and passing to CPU to generate command information", AB: Research Disclosure, vol. 327, No. 048, Jul. 10, 1991, Emsworth, G.B.

*Primary Examiner*—Karl D Frech
*Attorney, Agent, or Firm*—Fulbright & Jaworski, LLP

[57] ABSTRACT

A magnetic head 17 reads first character information having a predetermined presentation form magnetically recorded on a photographic film 2, and an exposing unit 5 exposes a photosensitive material 3 with a photographic image of the photographic film. A character-information processing unit 70 converts the first character information read by the magnetic head 17 into second character information having a different presentation form than the first character information in accordance with an instructed conversion rule, and a character exposing unit 30 prints the second character information on the photosensitive material 3 in correlation with the photographic image of the photographic film 2.

8 Claims, 3 Drawing Sheets

FIG. 5

| TITLE CODE | ENGLISH | NORWEGIAN | PORTUGUESE |
|---|---|---|---|
| 00 | Christmas | Jul | Natal |
| 01 | Birthday | Fødselsdag | Aniversário |
| 02 | Holiday | Ferie | Férias |
| 03 | Honeymoon | Bryllupsreise | Lua de mel |
| 04 | Marriage | Bryllup | Casamento |
| 17 | Happy Birthday | Gratulerer med fødselsdagen! | Feliz Aniversário |
| 18 | Congratulations | Gratulerer! | Parabéns |
| 19 | Merry Christmas | God Jul | Feliz Natal |
| 20 | Festival | Festival | Festival |
| 21 | Entrance | Første skoledag | Primeiro dia de aula |
| 22 | Travel | Påtur | Excursão |
| 23 | New Year | Nyttår | Ano Novo |
| 24 | Easter | Påske | Páscoa |
| 25 | Happy New Year | Godt Nytt År! | Feliz Ano Novo |

PHOTOGRAPHIC PRINTING APPARATUS

BACKGROUND OF THE INVENTION

1. Filed of the Invention

The present invention relates to a photographic printing apparatus including a reader means for reading character information magnetically recorded on a photographic film, an exposing unit for exposing a photosensitive material with an image recorded on the photographic film, and a printing means for printing the character information on the photosensitive material.

2. Description of the Related Art

The photographic printing apparatus described above is designed for use in printing a photographic film capable of magnetically recording character information in the course of the photography. Namely, the apparatus is provided in accordance with the so-called Advanced Photo System. With this apparatus, the character information recorded on such photographic film is read by the reader means, and then the printing means prints this character information on a photosensitive material such as a print paper which was exposed with image of the film. In this respect, the convention provides the two types, i.e. one type of printing the character information on the same front side of the photosensitive material as the image and the other type of printing the information on the back side of the material.

The character information to be recorded on the photographic film may be presented in different kinds of languages. In addition, in the case of the Japanese language for instance, the information may also be presented in different notations such as the Roman character notation, 'katakana' notation. The printer prints the information without any modifications thereof, namely, exactly as the reader means reads the information from the photographic film. Specifically, in the case of English language character information, this information will be printed in the particular presentation form as required by the English language. In the case of French language information, the information will be printed in the form required by the French language.

Further, if the character information is given in the Japanese 'katakana' notation, the printing of this information will be presented in that notation.

According to the convention, as described above, the character information may be printed only in exactly the same presentation form as that of its recording. And, the predetermined presentation forms allowed by the convention are limited to those of the languages which are relatively widely used in the world. Hence, it cannot be said that the consumer is allowed much freedom in the character information to be printed. This fact decreases the usefulness and attraction of the new system. One cannot afford to dismiss this disadvantage if world-wide acceptance and popularity is expected from the new system. Moreover, even if the form is given in the native language of the consumer, the consumer find it still unattractive, if he/she is denied any freedom in the contents, e.g. sentences or phrases or presentation style.

SUMMARY OF THE INVENTION

A primary object of the present invention is to provide a photographic printing system which may print the character information on the photosensitive material in a readable and attractive manner for the consumer.

For generating characters to be printed by printing means on a photosensitive material in correlation with an image of a photographic film, the apparatus according to the invention comprises character-information converter means for converting first character information read by reader means into second character information having a presentation form different from that of the first character information in accordance with an instructed conversion rule.

With the above construction, the first character information read from the photographic film by the reader means is printed on the photosensitive material in the form of the second character information which has been converted from the first character information in accordance with a conversion rule determined as requested by the consumer. That is to say, the apparatus allows two printing modes, one mode for printing the first character information read from the photographic film directly, i.e. without any modifications thereof, on the photosensitive material just like the convention and the other mode for printing the first character information on the photosensitive material after converting the information into the second character information having a modified presentation form as requested by the consumer. Therefore, the consumer may obtain a print having the character information printed in the best presentation form as he/she wishes.

According to one preferred embodiment, the first character information comprises a character group consisting of predetermined plural character sets. So that, a character set selected from the character group is recorded on the photographic film. Storage means stores character sets of the second character information in correlation with the respective character sets of the character group. Then, by using this storage means, the character-information converter means converts the character set of the first character information into the correlated character set of the second character information. With this construction, in accordance with a conversion rule set as desired by the consumer, the character set read by the reader means from the photographic film is converted, through an access to the storage means, into a character set of a further presentation form requested by the consumer, and this character set of the requested presentation form is printed on the photosensitive material. More specifically, most of the character information to be recorded on a photographic film can be classified into some typical kinds, such as concerning the seasons or special events or occasions. Then, character sets relating to such typical kinds will be prepared as the first character information, so that at the time of photography the user may freely select one from these predetermined character sets and record the selected one on the photographic film. Then, if the storage means, e.g. a ROM or a memory card, stores character sets as the second character information having a different presentation form in correlation with the predetermined character sets of the first character information, the character-information converter means, through an access to this storage means, may quickly search and obtain the character set of the second character information which corresponds to the character set of the first character information read by the reader means and which also has a particular presentation form requested by the consumer. That is, the converter means can speedily effect the conversion operation from the first character information to the second character information.

According to a further preferred embodiment, the character-information converter means is capable of converting the first character information into the second character information by translating the first character information into a particular language requested by the consumer. With this feature, if the first character information is given in a language which is not friendly to the consumer, the apparatus may convert the information into a language friendly to the consumer. Hence, this will further promote the world-wide acceptance of the service afforded by the new system of providing printed characters on the photosensitive material.

As to the inter-language information conversion, in particular, the availability of the conversion from the English to the Chinese or to the Korean will provide a significant economic advantage, if one considers the significant number of potential users of these languages and their world-wide geographical distribution of those peoples who use these languages as their native tongues. Further, even within one language group, there sometimes exist a plurality of different notations in used in a mixed state. For instance, in the case of the Japanese language, the 'kana' characters, 'katakana' characters and the Chinese characters are being used in a mixed state. Similarly, in the case of the Korean language, the Hangul alphabet and the Chinese characters are used in combination. In such situations, the character-information converter means having the above-described feature of inter-notation conversion will be advantageous.

According to a still further preferred embodiment of the invention, the character-information converter means is capable of reducing a printing scale of the second character information in case the number of the characters constituting the converted second character information exceeds a predetermined maximum value at which the characters may be printed in a standard scale on the photosensitive material. With this feature, it becomes possible to avoid such inconvenience that the second character information is not completely printed and the consumer finds it difficult to understand the information because of its incomplete presentation. Accordingly, the apparatus with this further feature can always provide the consumer with readable printed characters regardless of the type of conversion effected from the first character information to the second character information.

If the second character information is printed on the side of the photosensitive material to be printed with the image, there accrues a further advantage, for the consumer, of allowing clear and easy correspondence between the image and the character information from the same single side of the photosensitive material.

Further and other objects, features and effects of the invention will become more apparent from the following more detailed description of the embodiments of the invention with reference to the accompanying drawings.

BRIEF DESCRIPTION OF THE DRAWINGS

FIG. 5 is a diagram illustrating a plurality of character sets stored in the character-information processing unit of FIG. 3.

DESCRIPTION OF THE PREFERRED EMBODIMENTS

Figure 1:
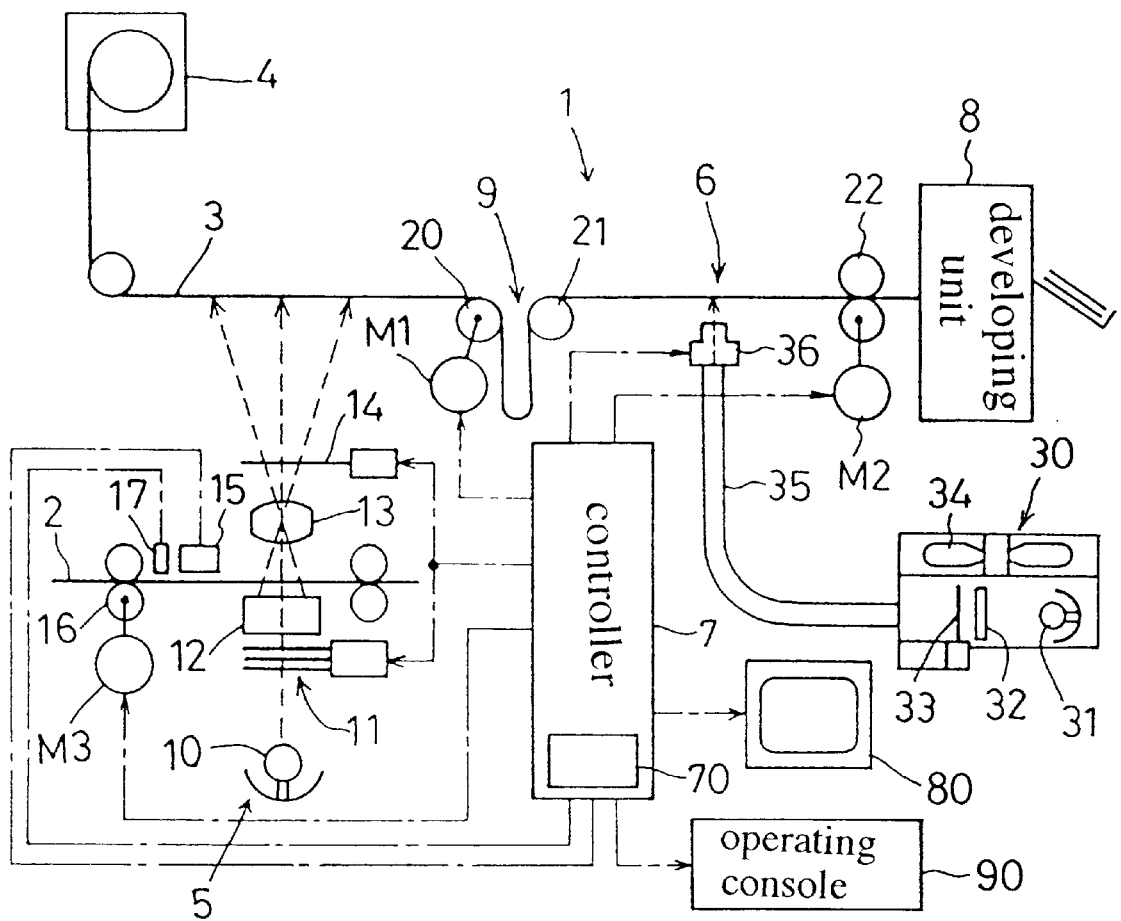
FIG. 1 is a block diagram showing a schematic construction of a photographic printing apparatus relating to one preferred embodiment of the invention.

As shown in FIG. 1, a photographic printing apparatus 1 includes an exposing unit 5 for exposing a print paper 3 as a photosensitive material with an image recorded on a photographic film 2 (to be sometimes referred to as "film 2" hereinafter), a moving exposing unit 6 for exposing the print paper 3 with various character information, a loop forming unit 9 for forming a loop of the print paper 3 so as to allow the print paper 3 to be transported at the exposing unit 5 and the moving exposing unit 6 independently of each other, a developing unit 8 for developing the exposed print paper 3, and a controller 7 for controlling various operations of the photographic printing apparatus 1. The controller 7 is connected with an operating console 90 including e.g. a keyboard for allowing various command inputs and also to a monitor 80 for displaying operation menu, image information and the like.

The print paper 3 is stored in a rolled state within a print-paper magazine 4. Then, after being withdrawn from the magazine 4, the print paper 3 is exposed either at the exposing unit 5 alone or at both the exposing unit 5 and the moving exposing unit 6, and then the paper 3 is developed at the developing unit 8 to be cut into sheets each containing one frame amount of image information.

Next, the above-described components will be described respectively.

The exposing unit 5 includes, along a common optical axis, a projecting exposing light source 10, a modulating filter 11 for adjusting balance of color components of the light to be irradiated on the film 2, a mirror tunnel 12 for uniformly mixing the color components of the light past the modulating filter 11, a printing lens 13 for focusing image information of the film 2 on the print paper 3 and a shutter 14.

Upstream of the exposing unit 5 in a film transport passage, there is disposed an image sensor 15 for scanning the image information of the film 2 with dividing the information into a number of areas. This image sensor 15 irradiates white light on to the film 2 and separates its reflection or transmission light into the three primary color components of red, green and blue to be measured by e.g. a CCD line sensor or a CCD image sensor or the like. The image information scanned by the image sensor 15 is sent to the controller 7, at which the information is used for determination of exposure conditions used by the exposing unit 5 and used also for obtaining a simulated image which would be obtained on the print paper 3 if the paper 3 is exposed under such exposure conditions. This simulated image is displayed on the monitor 80.

Figure 2:
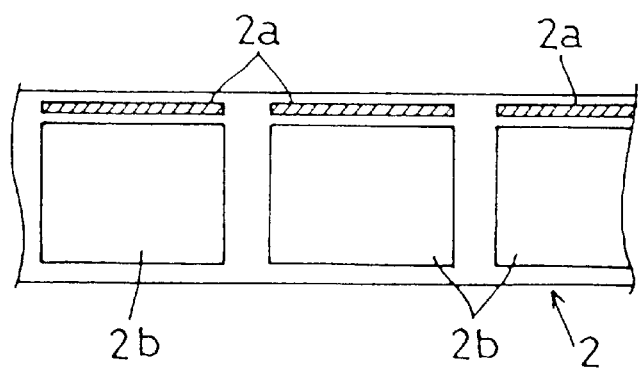
FIG. 2 is a diagram showing a photographic film used in the embodiment of the photographic printing apparatus.

Upstream of the image sensor 15 in the film transport passage, there is provided a magnetic head 17 as a reader means for reading character information recorded at a magnetic recording portion 2a of the film 2 shown in FIG. 2. The magnetic recording portion 2a is provided at each margin beside a frame 2b. In addition, a further recording portion is provided at the leading end frame 2b of frames 2b serially disposed. This further recording portion is for recording information which pertains commonly to the entire roll of film 2. Here, in this specification, the character information to be recorded on the film 2 will be referred to as first character information. And, further character information which is obtained by converting the first character information to be used by the printer will be referred to as second character information, as will be described in greater details infra. Throughout the specification, these two kinds of character information are clearly distinguished from each other for the understanding of this invention. However, if information is used in such a manner as to generically include both of these two kinds of information, such information will be referred to simply as "character information".

The magnetic recording portion 2a of the film 2 is used for recording photographic condition information such as a type of camera used, a kind of lens used, a frame number, a film speed, date of photography, presence of absence of quasi-zooming/panoramic photography, against-the-light/under- or over-exposure, use or non-use of flash, color temperature of the flash, shutter speed, aperture value, camera-to-object distance, orientation or posture of the camera at the time of photography and recording also the first character information which comprises e.g. a comment such as "snowy mountain", "setting sun", "portrait", electively and optionally inputted by the consumer, i.e. the photographer as pertaining to the subject of photography.

Of the various kinds of information as above read by the magnetic head 17, the various kinds of photographic condition information is used for determination of exposure conditions to be utilized for exposure at the exposing unit 5 of a frame 2b corresponding to this information. Whereas, the first character information inputted by the photographer is converted into the second character information and then this second character information is exposed, at the moving exposing unit 6, on the print paper 3 in correlation with the image of the film 2. Incidentally, through input of a command from the operating console 90, the photographic condition information too may be exposed on the print paper 3 at the moving exposing unit 6.

Upstream of the magnetic head 17 in the film transport passage, there are disposed a roller 16 for feeding the film 2 to the exposing unit 5 and a motor M3 for rotatably driving the roller 16.

For an exposing operation at the exposing unit 5, the controller 7 calculates exposure conditions, based on the image information of the film 2 scanned by the image sensor 15 and the photographic condition information of the film read by the magnetic head 17. Then, based on the calculated exposure conditions, the controller 7 controls an amount of filter insertion of the modulating filter 11 and an opening time period of the shutter 14 to print the image information of the film 2 on to the print paper 3.

The loop forming unit 9 includes rollers 20, 21 for transporting the print paper 3 and a motor M1 for rotatably driving the roller 20. Further, between the upstream roller 20 and the downstream roller 21 in the print paper transporting direction, though not shown, there is provided a flap which is switchable between a state for guiding the print paper 3 between the rollers 20, 21 along a straight path and a further state for allowing the print paper 3 to be formed into a loop as shown in FIG. 1, so that the transport speed of the print paper 3 may be set independently at the exposing unit 5 and the moving exposing unit 6.

The moving exposing unit 6 includes a character exposing unit 30 as a printer means. This character exposing unit 30 includes an exposing light source 31, an IR cut filter 32 for eliminating infrared component from the light past the exposing light source 31 a shutter 33, a PLZT printing head 36, and a bundle of optical fiber 35 for transmitting the light from the exposing light source 31 to the PLZT printing head 36. The exposing light source 31, the IR cut filter 32 and the shutter 33 are accommodated, together with a cooling fan motor 34, within one casing.

Thought not shown, the PLZT printing head 36 comprises a number of sub-assemblies each including a PLZT element interposed between a polarizer and an analyzer, with the sub-assemblies being arranged one-dimensionally in a transverse direction relative to the transporting direction of the print paper 3. In operation, by varying a potential to be applied between a pair of electrodes attached to each PLZT element, the PLZT selectively allows or inhibit transmission of light therethrough. In this manner, each PLZT element functions as a light shutter. Thus, by independently controlling the electric potentials to be applied to the number of PLZT elements, the second character information may be exposed on to the print paper 3. Downstream of the moving exposing unit 6 in the transporting direction of the print paper 3, there are disposed a roller 22 for transporting the print paper 3 and a motor M2 for rotatably driving this roller 22.

The moving exposing unit 6 separates the character data to be printed into a plurality of lines corresponding to the one-dimensional arrangement of the PLZT elements of the PLZT printing head 36, and the print paper 3 is intermittently advanced by the motor M2 one line after another while the character data are exposed one line after another by the PLZT printing head 36.

Though not shown, the developing unit 8 includes a plurality of tanks filled with processing liquids for developing the exposed print paper 3, so that through successive passage of these tanks the print paper 3 is developed.

In addition to the above-described functions of controlling the operations of the various apparatus components and calculating the exposure conditions, the controller 7 provides a further function of converting the first character information read by the magnetic head 17 into the second character information to be exposed by the PLZT printing head 36. For providing this function, the controller 7 includes a character-information processing unit 70 as a character-information converter means. In the instant embodiment, the processing unit 70 is capable of providing operation mode for converting the first character information read by the magnetic head 17 into the second character information having a presentation form different from that of the first character information and a further operation mode for allowing the first character information to be directly exposed by the PLZT printing head 36 without modifying the presentation form thereof (i.e. so-called 'transparent' transport). A conversion rule for regulating the type of conversion to be made may be selectively inputted from the operating console 90. Some typical conversion consoles include, but not limited to, a translation processing from one language to another, and a conversion from a code number of an abbreviation, as a kind of 'character set' into a predetermined correlated sentence.

Figure 3:
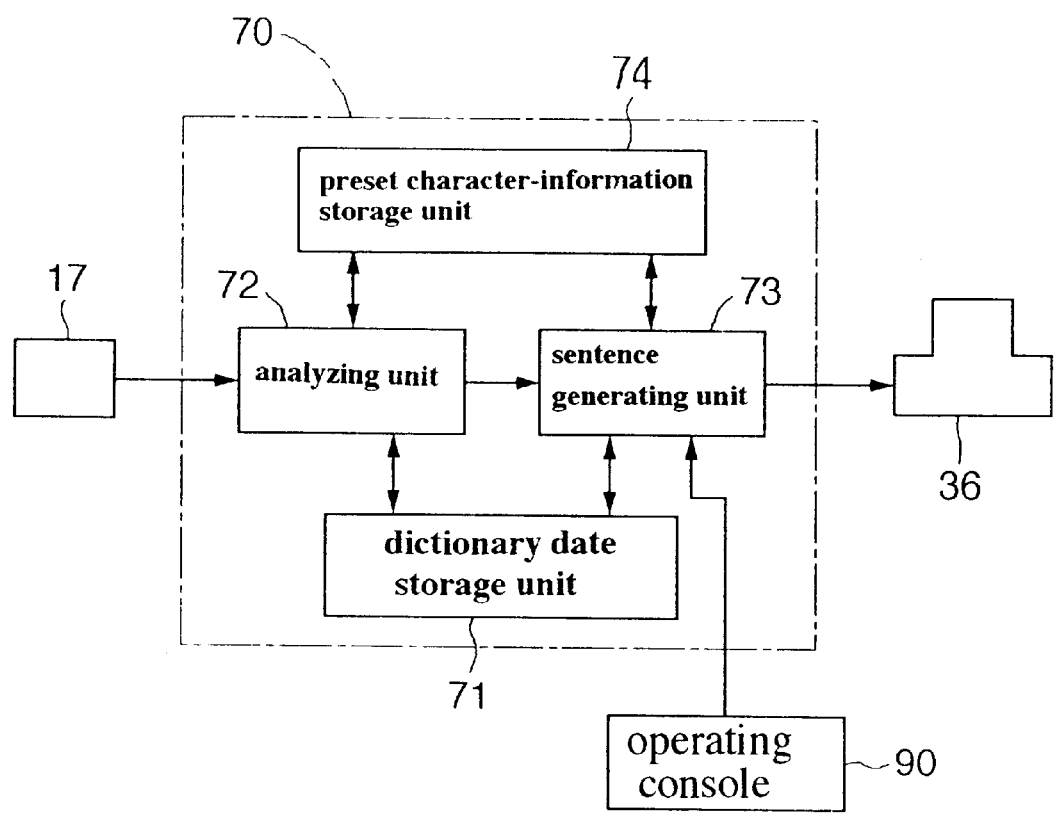
FIG. 3 is a block diagram showing a character-information processing unit used in the apparatus of FIG. 1.

For providing the above function, the character-information processing unit 70, as shown in FIG. 3, includes a dictionary data storage unit 71 storing dictionary data including grammatical information of various languages, an analyzing unit 72 for effecting, on the first character information read by the magnetic head 17, judgment of the language, separation of the phrase or sentence into individual words, analysis of the relationship among the words or of the structure and/or meaning of the sentence and so on. The processing unit 70 further includes a sentence generating unit 73 for generating the second character information of a predetermined presentation form based on a particular conversion rule selectively inputted from the operating console 90 and a preset character-information storage unit 74 which stores therein a group of correlated sentences or phrases in various languages classified under predetermined title codes as illustrated in FIG. 5. Then, by making an access to this preset character-information storage unit 74, a predetermined sentence in a predetermined language may be retrieved based on the title code, and also a sentence of an equivalent meaning in another language may be retrieved based on a sentence of one language. Here, the tile codes, sentences, abbreviations and the like will be generically defined as character information as character set. And, a plurality of such character sets are classified as a character group as illustrated in FIG. 5 and are stored in this state in the preset character-information storage unit 74. If this preset character-information storage unit 74 is adapted to be accessible from the operating console 90, then, the operator may maintain and control the preset character-information storage unit 74.

The analyzing unit 72 selectively obtains the first character information from the information read from the magnetic recording portion 2a by the magnetic head 17 and effects e.g. the above-described analysis of the kind of language. Also, if the character set contained in the selectively obtained first character information represents one of the title codes (the number shown in the left-hand column in the table shown in FIG. 5) correlated with a sentence, i.e. character set pre-stored in the preset character-information storage unit 74, then, the analyzing unit 72 notifies this to the sentence generating unit 73. With this, based on the result of analysis effected at the analyzing unit 72, the sentence generating unit 73, while referring to the dictionary data in the dictionary data storage unit 71, generates second character information in a predetermined presentation form according to the particular conversion rule inputted from the operating console 90. In this respect, it sometimes happens that the second character information is generated by converting the first character information into information in the same language but in a different notation. For instance, supposing that the first character information read by the magnetic head 17 is a character set in the Japanese 'kana' notation and a conversion rule from 'kana' notation to Chinese character notation is selectively inputted from the operating console 90; then, with reference to a Chinese character dictionary in the dictionary data storage unit 71, there will be generated, as the second character information, a sentence in the Chinese character notation, having the meaning obtained as the result from the analysis at the analyzing unit 72.

Further, if the first character information read by the magnetic head 17 is an English sentence and if a conversion rule from the English to Chinese is selectively inputted from the operating console 90; then, with reference to an English-Chinese dictionary in the dictionary data storage unit 71, there will be generated, as the second character information, a Chinese sentence having the meaning obtained as the result of the analysis at the analyzing unit 72. As the dictionary data storage unit 71 includes also an English-Korean dictionary, a Korean sentence may also be generated as the second character information.

Further, in ether of the case where the second character information having a presentation or notation form different from the first character information read by the magnetic head 17 is generated or the other case where the first character information read by the magnetic head 17 is used as it is as the second character information, the sentence generating unit 73 provides a further function of reducing the font size of the second character information if the number of the characters to be exposed by the PLZT printing head 63 would exceed the maximum number of characters which may be exposed on the print paper 3 if these characters were printed in a standard size. This setting of font size may be effected also from the operating console 90. If the title code is received from the analyzing unit 72, the sentence generating unit 73 reads out a character set of a predetermined language according to the conversion rule selectively inputted from the operating console 90 thereby to generate the second character information. In this, a further conversion rule is provided for generating this title code per se as the second character information.

After the generation of the second character information as described above, the sentence generating unit 42 converts this generated second character information into a plurality of individual lines of data to be exposed by the PLZT printing head 36.

Next, the operation of the photographic printing apparatus 1 having the above construction will be briefly described.

When the film 2 shown in FIG. 2 is charged to the exposing unit 5, the motor M3 is activated to transport this film 2 through the disposing positions of the magnetic head 17 and of the image sensor 15 to an exposing position. In the course of this transportation, the magnetic head 17 and the image sensor 15 serially read the recorded information of the magentic recording portion 2a and the image information of the frame 2b. These recorded information and image information are sent to the controller 7 to be used for e.g. calculation of exposure conditions. Upon completion of the calculation of the exposure conditions, a simulated image is displayed on the monitor 80 as described hereinbefore. While observing this simulated image displayed on the monitor 80, the operator inputs, from the operating console 90, correction values for the exposure conditons, if necessary. When the exposure conditons are finally determined, the filter insertion amount of the modulating filter 11 and the opening time period of the shutter 14 are determined, so that a printing operation on the print paper 3 is effected.

In the exposing unit 5, the above-described series of operations are repeatedly effected for each frame 2b of the film 2.

On the other hand, the print paper 3 having been exposed wih the image of the film 2 at the exposing unit 5 is transported via the loop forming unit 9 to the moving exposing unit 6 by the motor M2 and so on, in which unit 6, if the operational mode is set for exposing the first character information recorded at the magnetic recording portion 2a of the film 2, the print paper 3 is exposed, by the character exposing unit 30, with the second character information outputted from the character-information processing unit 70.

The selection of whether or not to expose the second character information at the moving exposing unit 6 and the selection of the conversion rule to be implemented by the character-information exposing unit 30 are effected through the operating console 90. The timing of effecting these selections may be set in advance to be before initiation of the printing operation of the film 2 or to be after the display of the simulated image on the monitor 80.

Figure 4:
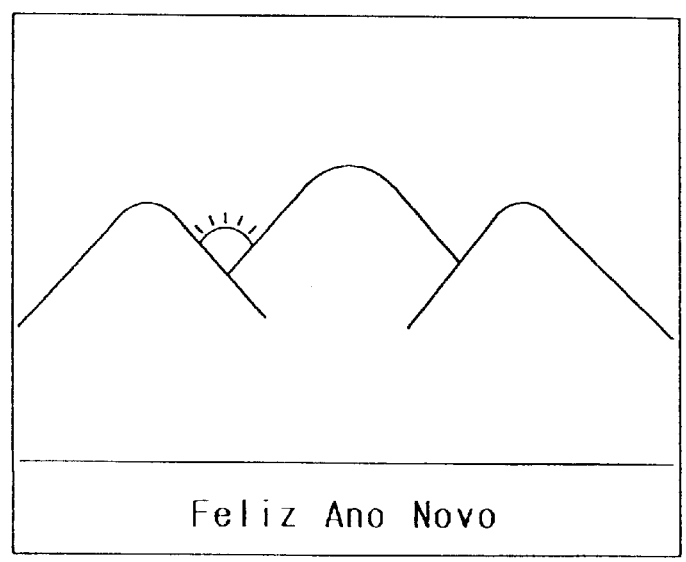
FIG. 4 is a diagram showing an exemplary printing of character information on a photosensitive material according to the apparatus of the invention.

For example, with selection of the Portuguese language as the second character information when the character information is to be exposed, if a title code: "25" is recorded as the first character information at the magentic recording portion 2a; then, the character-information processing unit 70 selects, from the information stored at the preset character-information storage unit 74 as shown in FIG. 5, a Portuguese character information: "Feliz Ano Novo" and sends this second character information to the PLZT printing head 36 to be exposed thereby. Then, when ths print paper exposed with this information is developed at the developing unit 8, a print sheet as shown in FIG. 4 is obtained.

In the foregoing embodiment, the character information read by the magnetic head 17 is printed on the image printing side of the print paper 3 as a photosenstive material.

Instead, the character information may be printed on the back side of the print paper 3.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A photographic printing apparatus comprising:
    reader means for reading first character information of a first language magnetically recorded on a photographic film;
    an exposing unit for exposing a photosensitive material with a photographic image recorded on the photographic film;
    an analyzing unit for determining if the first language of the read first character information is a sentence or a predetermined code;
    an operating console for selecting a language of second character information to be combined with the photographic image recorded on the photographic film;
    character-information converter having a plurality of conversion rules for converting a character of the first language to a character of a second language, said character information converter comprising a sentence generating unit for converting a sentence in the first character set of information into a sentence of characters of the second language, wherein the character-information converter is operable to select one of the conversion rules for converting from a language judged by the analyzing unit into a further language selected by means of the operator console, and convert the first character information into second character information in accordance with a selected one of the conversion rules; and
    printing means for printing the second character information on the photosensitive material to be correlated with the image recorded on the photographic film.

2. A photographic printing apparatus as claimed in claim 1, wherein, when a printing length of the second character information exceeds a predetermined value, a font size of the second character information is reduced.

3. A photographic printing apparatus as claimed in claim 1, further comprising a preset character-information storage unit for storing preset character information correlated with the predetermined code, wherein the preset character-information storage unit stores the preset character information separately according to a plurality of languages; wherein the preset character-information storage unit stores Korean preset character information.

4. A photographic printing apparatus as claimed in claim 1, further comprising a preset character-information storage unit for storing preset character information correlated with the predetermined code, wherein the preset character-information storage unit stores the preset character information separately according to a plurality of languages, wherein the preset character-information storage unit stores Chinese preset character information.

5. A photographic printing apparatus comprising:
    reader means for reading first character information magnetically recorded on a photographic film;
    an exposing unit for exposing a photosensitive material with a photographic image recorded on the photographic film;
    an analyzing unit for judging if the first character information is a sentence or a predetermined title code;
    an operating console for selecting a language of second character information to be combined with the photographic image recorded on the photographic film;
    preset character-information storage unit for storing preset character information correlated with the title code, the preset character-information storage unit storing the preset character information separately according to a plurality of languages;
    a sentence generating unit having a plurality of conversion rules for converting the first character information into the second character information, wherein, when the analyzing unit judges that the first character information is a sentence, the sentence generating unit generates the second character information by translating the sentence into a language selected with the operating console, and wherein, when the analyzing unit judges that the first character information is a title code, the sentence generating unit generates the second character information by extracting, from the preset character-information storage unit, the title character in the language selected with the operating console based on the read title code; and
    printing means for printing the second character information on the photosensitive material to be correlated with the image recorded on the photographic film.

6. A photographic printing apparatus as claimed in claim 5, wherein, when a printing length of the second character information exceeds a predetermined value, a font size of the second character information is reduced.

7. A photographic printing apparatus as claimed in claim 5, wherein the preset character information storage unit stores Korean preset character information.

8. A photographic printing apparatus as claimed in claim 5, wherein the preset character-information storage unit stores Chines preset character information.

* * * * *